US011748271B2

(12) United States Patent
Dodds

(10) Patent No.: US 11,748,271 B2
(45) Date of Patent: Sep. 5, 2023

(54) DATA SECURITY FOR MEMORY AND COMPUTING SYSTEMS

(71) Applicant: Micron Technology, Inc., Boise, ID (US)

(72) Inventor: Brett K. Dodds, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 254 days.

(21) Appl. No.: 16/849,927

(22) Filed: Apr. 15, 2020

(65) Prior Publication Data

US 2021/0326273 A1 Oct. 21, 2021

(51) Int. Cl.

| | |
|---|---|
| ***G06F 12/00*** | (2006.01) |
| ***G06F 12/14*** | (2006.01) |
| ***G06F 12/02*** | (2006.01) |
| ***G06F 12/1009*** | (2016.01) |
| ***G06F 9/30*** | (2018.01) |
| ***G06F 21/79*** | (2013.01) |

(52) U.S. Cl.

CPC ...... *G06F 12/1408* (2013.01); *G06F 9/30029* (2013.01); *G06F 12/0246* (2013.01); *G06F 12/1009* (2013.01); *G06F 21/79* (2013.01); *G06F 2212/7201* (2013.01); *G06F 2221/0755* (2013.01)

(58) Field of Classification Search

CPC ............. G06F 12/1408; G06F 9/30029; G06F 12/0246; G06F 12/1009; G06F 21/79; G06F 2212/7201; G06F 2221/0755; G06F 12/109; G06F 12/145; G06F 2212/1052; G06F 2212/657; G06F 21/602; G06F 21/78

See application file for complete search history.

(56) References Cited

U.S. PATENT DOCUMENTS 8,060,756 B2 * 11/2011 Rao .................... G06F 12/1408 711/163
2001/0019613 A1 * 9/2001 Dillon .............. H04N 21/43607 380/240
2005/0033973 A1 * 2/2005 Kamada .................. G06F 21/71 713/193
2014/0237261 A1 * 8/2014 Diep .................. G06F 12/1408 713/189
2019/0042841 A1 * 2/2019 Tanaka ................. G06V 10/751
2020/0201785 A1 * 6/2020 Hanna ................. G06F 11/1048
2020/0226074 A1 * 7/2020 Durham ................ G06F 3/0623

* cited by examiner

*Primary Examiner* — John A Lane
(74) *Attorney, Agent, or Firm* — Perkins Coie LLP

(57) ABSTRACT

Methods, apparatuses, and systems related to securing memory data are described. A hardware circuit is configured to encrypt and decrypt memory data using a scrambling key unique to a computing process processing the memory data. In writing the memory data, the hardware circuit generates scrambled memory data based on encrypting the memory data according to the security key. The scrambled memory data is stored for the write operation instead of the memory data. When the same process reads back the scrambled data, the same security key can be used to decrypt the scrambled data and recover the initial unscrambled memory data.

24 Claims, 6 Drawing Sheets

DATA SECURITY FOR MEMORY AND COMPUTING SYSTEMS

TECHNICAL FIELD

The disclosed embodiments relate to apparatus, and, in particular, to apparatus with a data security mechanism and methods for operating the same.

BACKGROUND

In conventional computing systems, any privileged process running on such systems has the ability to access (e.g., read and/or write) any memory. As such, nefarious entities (e.g., hackers) exploit this ability to access valuable information if they are able to run a process with elevated privileges. While standard applications or web applications are not run as privileged, the nefarious entities have been able to gain privileged access or exploit hardware security holes.

DETAILED DESCRIPTION

Figure 1:
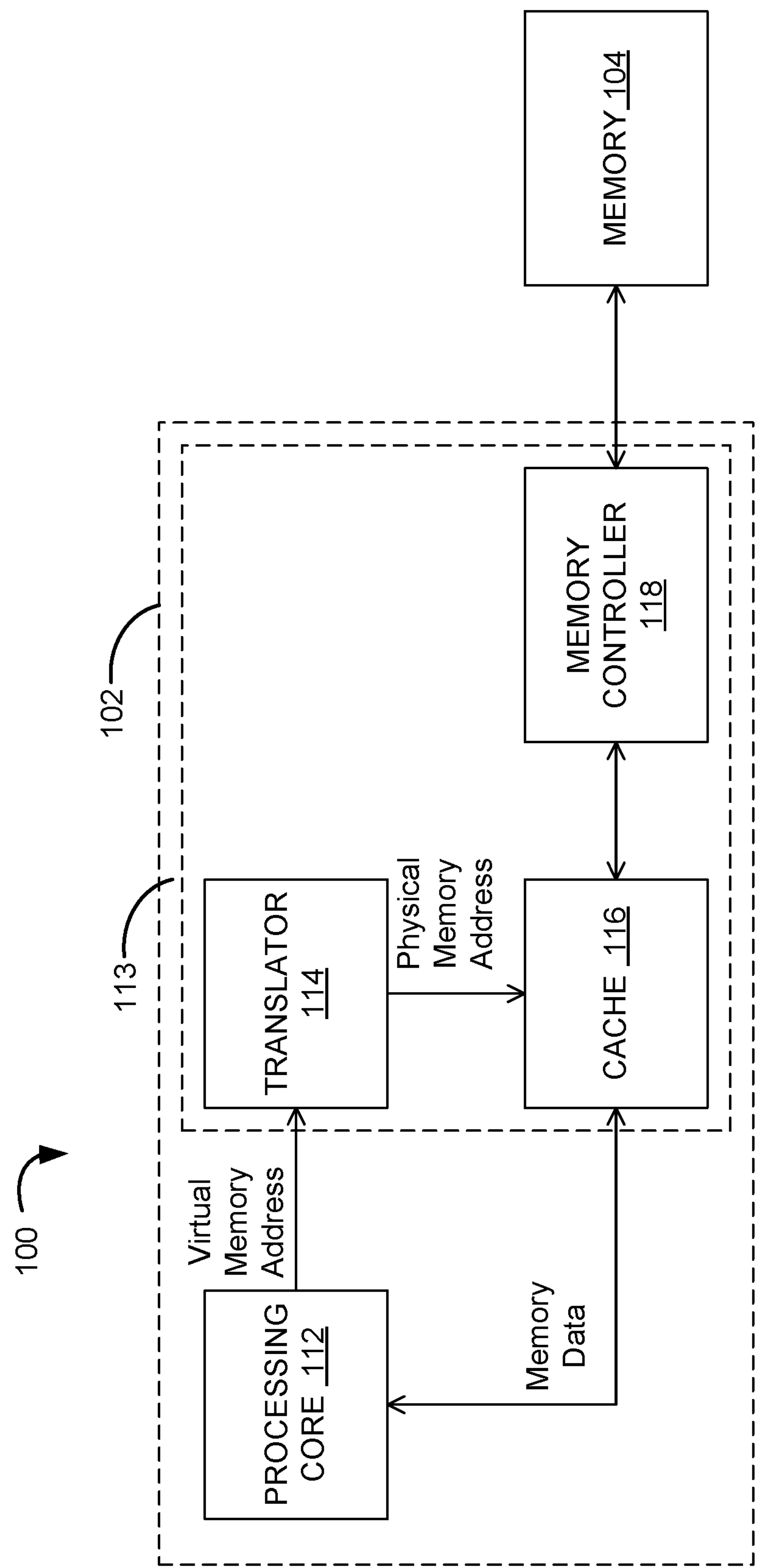
FIG. 1 is a block diagram of a computing system.

FIG. 1 is a block diagram of a computing system 100. The computing system 100 includes one or more processors 102 operably/electrically coupled to memory 104 (e.g., random access memory (RAM), Flash memory, hard disk drive (HDD), etc.) configured to store and provide access to information. Each of the processors 102 includes at least one processing core 112 coupled to a memory management unit (MMU) 113 that includes at least one translator 114 and at least one local cache memory 116. The processing core 112 processes data, such as by performing logic, bitwise, and/or arithmetic operations on data values according to software instructions. In processing the data, the processing core 112 provides virtual memory addresses to the translator 114, which may include logic or other circuitry that generates physical memory addresses based on the virtual memory address (via, e.g., page table sets or other lookup tables). Separately or in parallel, the processing core 112 provides or receives memory data (e.g., write or read content, respectively) to or from the local cache memory 116. The local cache memory 116 can include onboard memory (e.g., relatively fast category of volatile memory existing within the MMU 113) used to store various types of information.

The local cache memory 116 is functionally/electrically coupled to a memory controller 118 configured to control communications and/or functions of the memory 104. In other words, the memory controller 118 provides an interface for the memory 104 external to the processor 102. Accordingly, the memory controller 118 interfaces with the memory 104 to implement memory operations (e.g., reads and/or writes). For write operations, the memory controller 118 receives the write data and the write address (e.g., the physical memory address) and issues the corresponding memory commands, the write data, and/or the write address to the memory 104. For read operations, the memory controller 118 provides the read command and the corresponding read address to the memory 104 and receives the read data in response. The memory controller 118 provides the read data to the processing core 112 via the local cache memory 116 (e.g., temporary storage). The memory controller 118 may be included in the processor 102 or be a separate device (e.g., die) external to the processor 102.

Given the above-described structure, privilege process running on the processing core 112 may be able to access various portions of the memory 104. Nefarious entities (e.g., hackers) may exploit such configuration to gain access to valuable information stored in the memory 104. Embodiments of the present technology address these challenges by providing data security mechanisms that permits processes to only correctly interpret data written by those processes to the memory.

As described in greater detail below, the technology disclosed herein relates to an apparatus, such as for computing systems, processing systems, systems with processor devices, related methods, etc., for securing stored data. The apparatus (e.g., a processor and/or a system including the processor) can encrypt/decrypt data at a hardware layer. For example, a processor can include a scrambler circuit configured to encrypt memory data before storage and decrypt memory data from storage using a key unique to a computing process writing/reading the memory data. In some embodiments, the encryption key can correspond to each page table entry that describes a physical page for a process.

The hardware-based encryption/decryption of the memory data provides increased security for protecting the memory data from nefarious processes. Further, since the security is implemented at the hardware layer (i.e., transparent to the application developer), all applications/processes can access the increased security without adjusting the software. Moreover, the increased security can be applied beyond just specific memory ranges and to all memory associated with the process.

Figure 2:
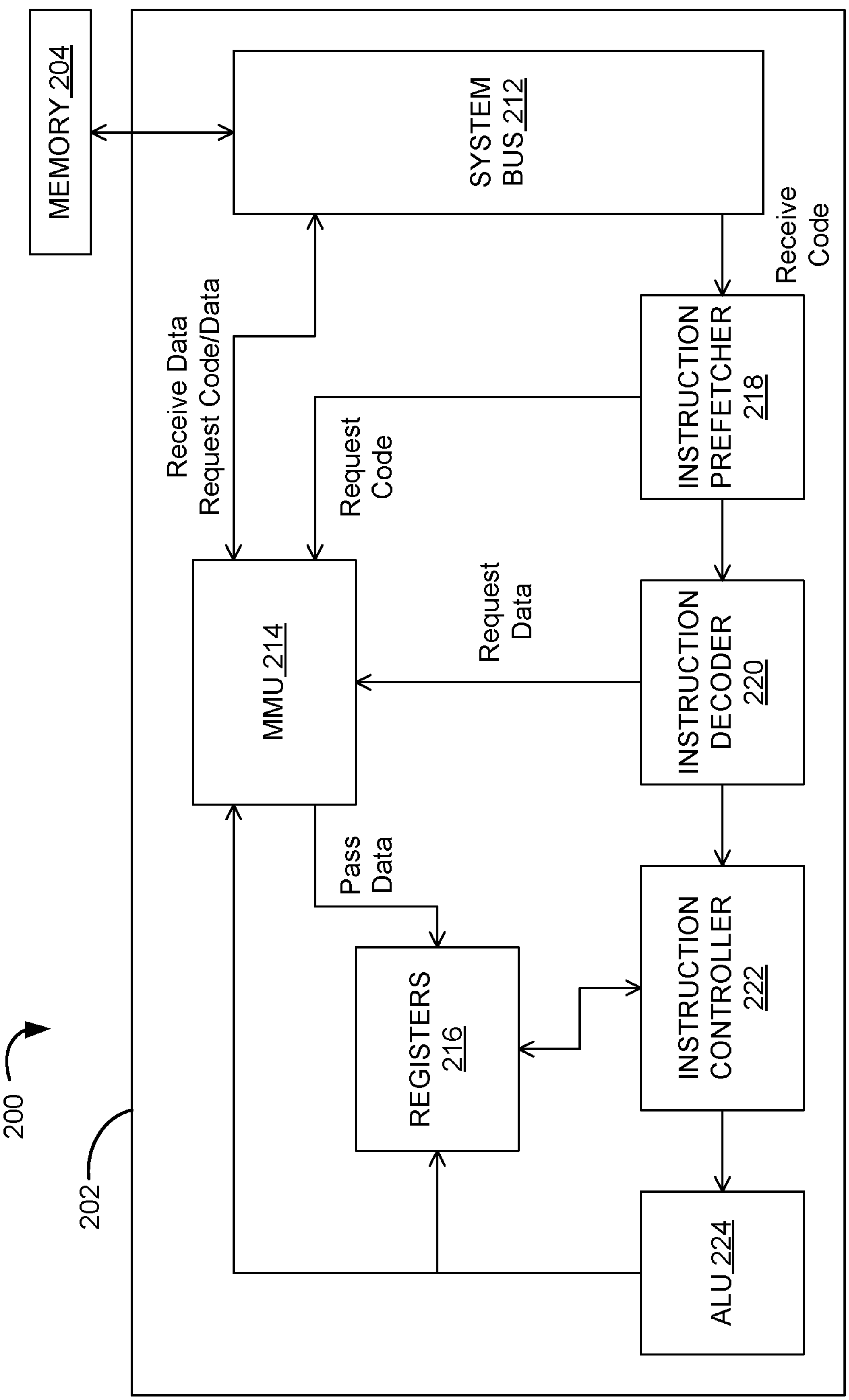
FIG. 2 is a block diagram of a system in accordance with an embodiment of the present technology.

FIG. 2 is a block diagram of a system 200 (e.g., a computing device or a system including the computing device) in accordance with an embodiment of the present technology. The system 200 can include a processor 202 operably/electrically coupled to memory 204 (e.g., RAM, Flash memory, HDD, etc.) that is configured to store and provide access to information, such as content data and/or software instructions.

The processor 202 can be configured to execute software instructions. In other words, the processor 202 can be configured to process the information, such as by implementing logic operations (e.g., AND, OR, etc.), arithmetic operations (e.g., additions), and/or bit-level operations (e.g., shifting, masking, etc.) on data according to instructions and/or circuit configurations, according to the software instructions. As an illustrative example, the processor 202 can be configured to access an initial set of instructions/data from a predetermined location, such as for booting/initializing the system 200 following a system power-on reset event. Once initialized, the processor 202 can iteratively fetch and execute the software instructions. In executing the software instructions, the processor 202 can write the content data (e.g., processing values/results) to the memory 204 and read the stored data from the memory 204.

In some embodiments, the processor 202 can include a system bus 212, a memory management unit (MMU) 214, a set of registers 216 (e.g., cache memory), an instruction pre-fetcher 218, an instruction decoder 220, an instruction controller 222, and/or an arithmetic logic unit (ALU) 224 for processing the information. The instruction pre-fetcher 218 can be configured to determine the instructions scheduled to be executed within a predetermined number of upcoming processing cycles. The instruction pre-fetcher 218 can send requests for the upcoming instructions to the MMU 214. Based on the requests, the MMU 214 can interact with the system bus 212 to receive software instructions.

The system bus 212 can be configured to interface with the memory 204 in communicating the instructions and/or the data between the processor 202 and the memory 204. For example, the system bus 212 can receive requests from the MMU 214 for the software instructions stored in the memory 204. Based on the received requests, the system bus 212 can interact with the memory 204, such as by sending commands to, sending addresses to, and/or receiving the corresponding software instructions from the memory 204. The system bus 212 can similarly interface with the memory 204 to read and write the content data as a part of executing the software instructions. When the system bus 212 receives a read or a write request from the ALU 224, the system bus 212 can similarly communicate commands, addresses, and/or the content data with the memory 204. The system bus 212 can provide the received/read content data to the MMU 214, which can further provide the read content data to the registers 216 for processing by the ALU 224.

The system bus 212 can provide the received software instructions to the instruction decoder 220. The instruction decoder 220 can be configured to decode software instructions into machine-level instructions executable by the ALU 224. The instruction decoder 220 can decode the software instructions according to one or more predetermined processes. The instruction decoder 220 can provide the machine-level instructions to the instruction controller 222.

The instruction controller 222 can be configured to sequence the machine-level instructions according to the current state of the processor 202. For example, the instruction controller 222 can determine or track the content data currently loaded in the registers 216. There, instruction controller 222 can determine the machine-level instructions that can be executed at the current time and the ones that can be executed at a later time, such as due to a sequence associated with software instructions and/or the content data currently in the registers 216. The instruction controller 222 can provide the machine-level instructions to their ALU 224 according to the resulting sequence.

The ALU 224 (e.g., a processing core) is configured to execute the machine-level instructions. The ALU 224 can access and operate on the content data stored in the registers 216 according to the machine-level instructions. The ALU 224 can send results of the machine-level instructions to the MMU 214 to be written out to the memory 204.

The MMU 214 is configured to manage access to the memory 204, such as for read and/or write operations. The MMU 214 can translate virtual memory addresses (e.g., memory addresses used by an operating system and/or the software instructions) to physical addresses used by the memory 204. The MMU 214 can further handle memory protection, cache control, bus arbitration, and/or memory bank switching.

As described in further detail below, the MMU 214 can include HW circuitry configured to track scrambling keys along with page table sets for processes executed by the processor 202. The MMU 214 can further include a scrambler circuit configured to encrypt/decrypt the content data using the scrambling keys. In writing the data, the MMU 214 can use the scrambler circuit to encrypt the write data according to a key specific to the computing process writing the data. The MMU 214 can send the scrambled result to the memory for storage. In reading back the data, the MMU 214 can receive the scrambled result from the memory 204 and then decrypt the scrambled result using the scrambler circuit according to the key associated with the computing process reading the data. Accordingly, when the same computing process writes and reads the same data, the scrambler circuit can recover the original content data. However, when a computing process (e.g., a nefarious software/process) attempts to read the content data written by a different process, the scrambler circuit can produce a result that is different than the originally stored content since the process-specific keys utilized to encrypt and decrypt the data are different.

Figure 3:
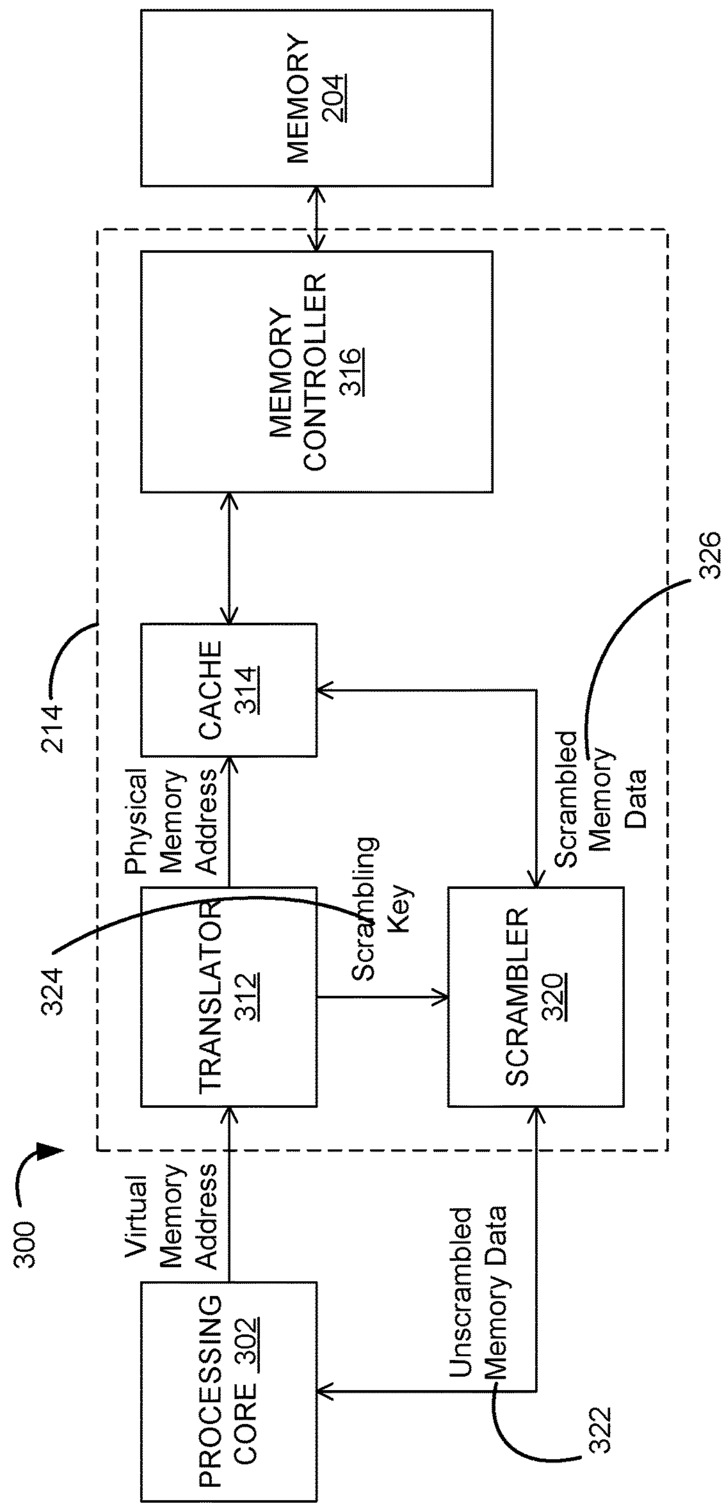
FIG. 3 is a detailed block diagram of a memory management unit in accordance with an embodiment of the present technology.

FIG. 3 is a detailed block diagram of a memory management unit (e.g., the MMU 214) in accordance with an embodiment of the present technology. As described above, the MMU 214 can be coupled to a processing core 302 (e.g., the ALU 224 of FIG. 2) and the memory 204. In some embodiments, the MMU 214 can include a translator 312, a local cache 314, and/or a memory controller 316 for managing access to/communications with the memory 204.

The translator 312 can be configured to translate virtual memory addresses used by the operating system and/or the software instructions into physical memory addresses used by the memory 204. In some embodiments, the translator 312 can be configured to manage and track page tables for one or more processes executed by processor 202 of FIG. 2. The page tables can include mappings between the virtual memory addresses and the physical memory addresses for the corresponding process. As an illustrative example, the translator 312 can receive the virtual memory address from the processing core 302 in executing a process. The translator 312 can access the page tables for the corresponding process and generate the physical memory address corresponding to the virtual memory address.

The translator 312 can provide the physical memory addresses to the local cache 314. The local cache 314 (e.g., buffers and/or registers within the MMU 214) can be configured to store information communicated with the memory device 204. For example, the local cache 314 can temporarily store the physical addresses for communicating with the corresponding read or write command. Also, the local cache 314 can temporarily store write data for communication to the memory 204 and/or temporarily store the read data from the memory 204 received in response to the read command.

The memory controller 316 can be configured to interface with the memory 204, such as by controlling communications and/or one or more functions/states of the memory 204. The memory controller 316 can generate and send memory commands (e.g., read and/or write commands) that correspond to requests from the processing core 302 to the memory 204. The memory controller 316 can further send the translated addresses the correspond to the requests to the memory 204 to implement the corresponding read and/or write operations. The memory controller 316 can accordingly send data to be written to the memory 204 (e.g., at a location corresponding to the translated physical address) for write operations and receive previously written data from the memory 204 (e.g., data stored at the location corresponding to the translated physical address) for read operations.

The MMU 214 can include a scrambler circuit 320 configured to encrypt/decrypt the content data. For a write operation, the scrambler circuit 320 can receive unscrambled memory data 322 (e.g., content data) from the processing core 302. The translator 312 can provide to the scrambler circuit 320 a scrambling key 324 that corresponds to the computing process initiating the write operation. The scrambler circuit 320 can use the scrambling key 324 and the unscrambled memory data 322 as inputs to generate scrambled memory data 326 as an encrypted output/result of the unscrambled memory data 322. The scrambler circuit 320 can include one or more hardware configurations to generate the scrambled memory data 326. In some embodiments, for example, the scrambler circuit 320 can generate the scrambled memory data 326 based on applying exclusive OR (XOR) operations to the unscrambled memory data 322 and the scrambling key 324. The scrambler circuit 320 can provide the scrambled memory data 326 to the local cache 314, and the memory controller 316 can write the scrambled memory data 326 to the memory 204 instead of the original unscrambled memory data 322.

Accordingly, for operations, the processor 202 can receive the scrambled memory data 326 from the memory 204. The scrambled memory data 326 can be provided to the scrambler circuit 320 as described above. The scrambler circuit 320 can further receive from the translator 312 the scrambling key 324 for the computing process initiating the read operation. The scrambler circuit 320 can use the scrambled memory data 326 and the scrambling key 324 as inputs to generate the unscrambled memory data 322. In other words, the scrambler circuit 320 can decrypt the scrambled memory data 326 according to the scrambling key 324 of the computing process implementing the read operation. The scrambler circuit 320 can use the same configuration as the encryption or a different configuration that is complementary (i.e., that reverses) the encryption to decrypt the scrambled memory data 326.

As a result, the processor 202 can recover the unscrambled memory data 322 when the scrambling key 324 includes the same values as used during the encryption process. In other words, the processor 202 can reproduce the unscrambled memory data 322 when the same computing process that wrote the data implements the read operation. Otherwise, when a computing process (e.g., a nefarious process) initiates a read operation to read data associated with the different process, the processor 202 can generate values that are different from the original unscrambled memory data 322 since the computing process corresponds to a different scrambling key.

Figure 4:
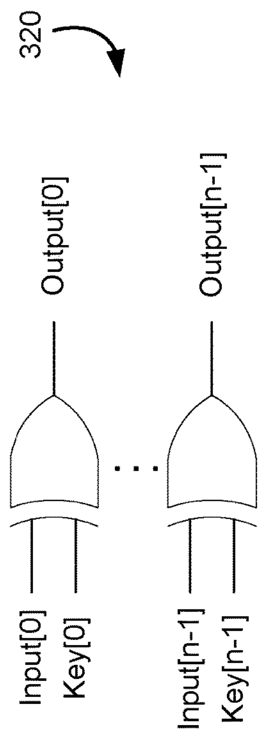
FIG. 4 is a detailed block diagram of an example scrambling circuit in accordance with an embodiment of the present technology.

FIG. 4 is a detailed block diagram of an example scrambling circuit (e.g., the scrambler circuit 320) in accordance with an embodiment of the present technology. In some embodiments, the scrambler circuit 320 can generate the scrambled memory data 326 of FIG. 3 based on combining (e.g., according to one or more predetermined logical, bit-wise, and/or arithmetic operations) the scrambling key 324 and the unscrambled memory data 322. For example, the scrambler circuit 320 can include a set of XOR gates that generate an output based on combining an input with the scrambling key 324.

In some embodiments, the scrambler circuit 320 can include XOR gate for each bit within the stored data. In other words, the scrambler circuit 320 can include a quantity of XOR gates that matches the number of bits (e.g., 8 bit, 16 bits, etc.) within each unit of stored data. Each XOR gate can operate on one of the input bits and one of the bits of the scrambling key 324. For writing operations, each XOR gate can operate on one of the bits in the unscrambled memory data 322 and one of the bits in the scrambling key 324 to generate one of the bits in the scrambled memory data 326. For reading operations, each XOR gate could operate on one of the bits in the scrambled memory data 326 and one of the bits in the scrambling key 324 to generate one of the bits in the unscrambled memory data 322.

Figure 5:
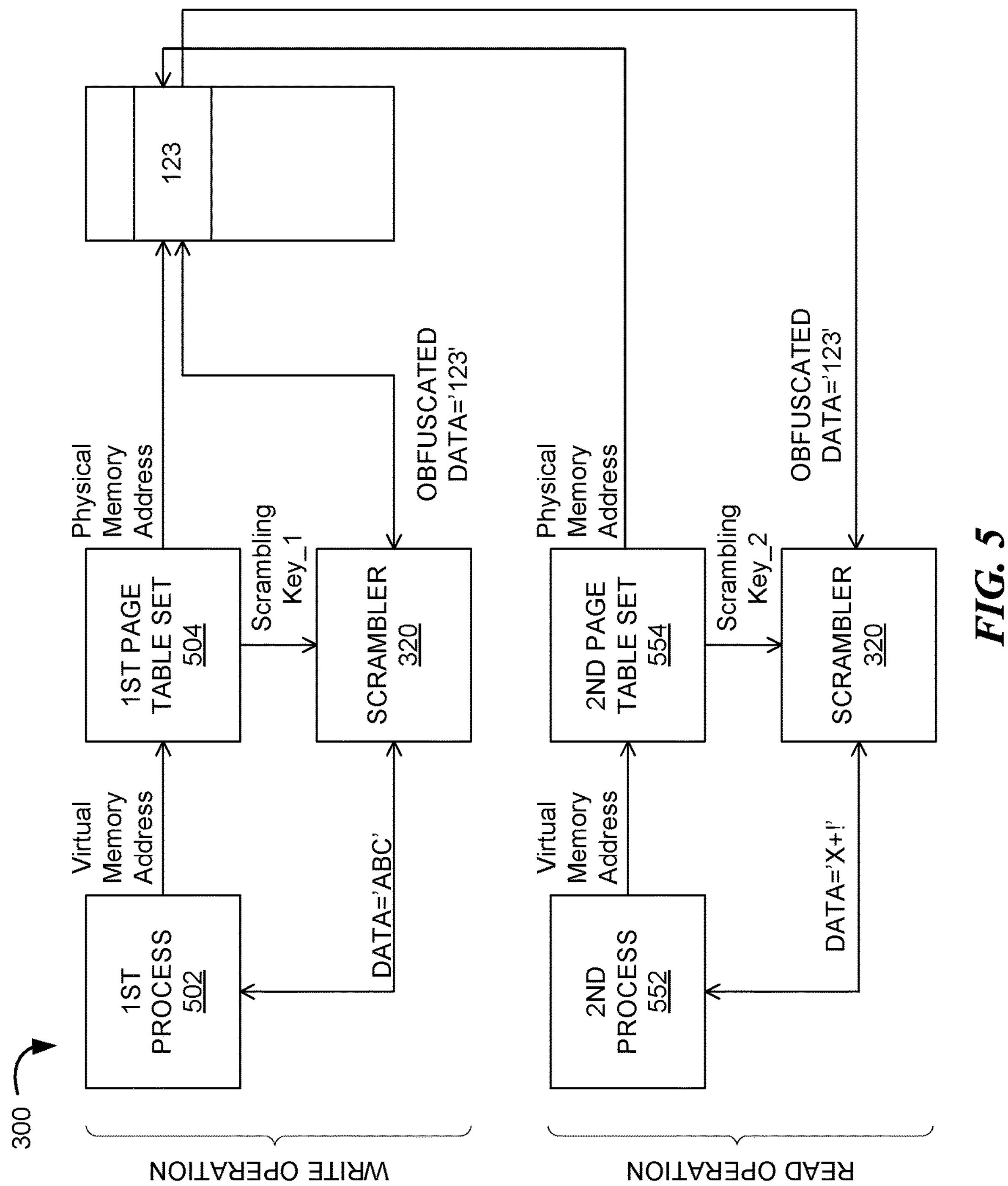
FIG. 5 is an illustration of the memory management unit of FIG. 3 processing an unauthorized access in accordance with an embodiment of the present technology.

FIG. 5 is an illustration of the MMU 214 of FIG. 3 processing an unauthorized access 300 in accordance with an embodiment of the present technology. The unauthorized access 300 can correspond to a write operation initiated by a first process 502 (e.g., an instance of a computer program that is being executed by one or more threads) and the read operation initiated by a second process 552 (e.g., a nefarious process) for the same memory location.

For the first process 502, the MMU 214 (e.g., the translator 312 of FIG. 3) can maintain a first page table set 504. In some embodiments, the MMU 214 can store and track the scrambling keys 324 of FIG. 3 assigned to the processes within the page table sets corresponding to the processes. For such embodiments, the first page table set 504 can include a first scrambling key that corresponds to the first process 502.

When the first process 502 initiates a write operation to store data 'ABC', the processing core 302 of FIG. 3 can provide the virtual memory address to the MMU 214 and the data to the scrambler circuit 320. Accordingly, the MMU 214 (e.g., the translator 312) can use the first page table set 504 to generate the physical memory address. Also, the MMU 214 can also read the first scrambling key from the first page table set 504 and provide scrambling key to the scrambler circuit 320. As described above, the scrambler circuit 320 can generate the scrambled memory data 326 of FIG. 3 (e.g., '123') based on encrypting the data from the first process 502. The processor 202 of FIG. 2 can store the scrambled memory data 326 at the translated physical memory address in the memory 204 of FIG. 2.

For the second process 552, the MMU 214 (e.g., the translator 312) can maintain a second page table set 554. Accordingly, in some embodiments, the second page table set 554 can include a second scrambling key that corresponds to the second process 552.

When the second process 552 initiates a read operation to read from the same physical memory addressing the memory 204, the translator 312 can receive the same virtual memory address for the processing core 302. Accordingly, the MMU 214 can access the second page table set 554 to generate the same physical memory address that was used for the write operation initiated by the first process 502. The processor 202 can retrieve the scrambled memory data 326 based on the physical memory address. The scrambler circuit 320 can receive the scrambled memory data 326. The scrambler circuit 320 can also receive the second scrambling key associated with the second process 552. The scrambler circuit 320 can implement the decryption using the second scrambling key. However, since the first and second scrambling keys correspond to different processes and, therefore, have different values, the decrypted output (e.g., 'X+!') can be different from the originally written data (e.g., 'ABC'). Thus, by encrypting and decrypting the memory data according to scrambling keys that are specific to the requesting processes, the MMU 214 can provide security at a hardware level to protect the memory data.

Figure 6:
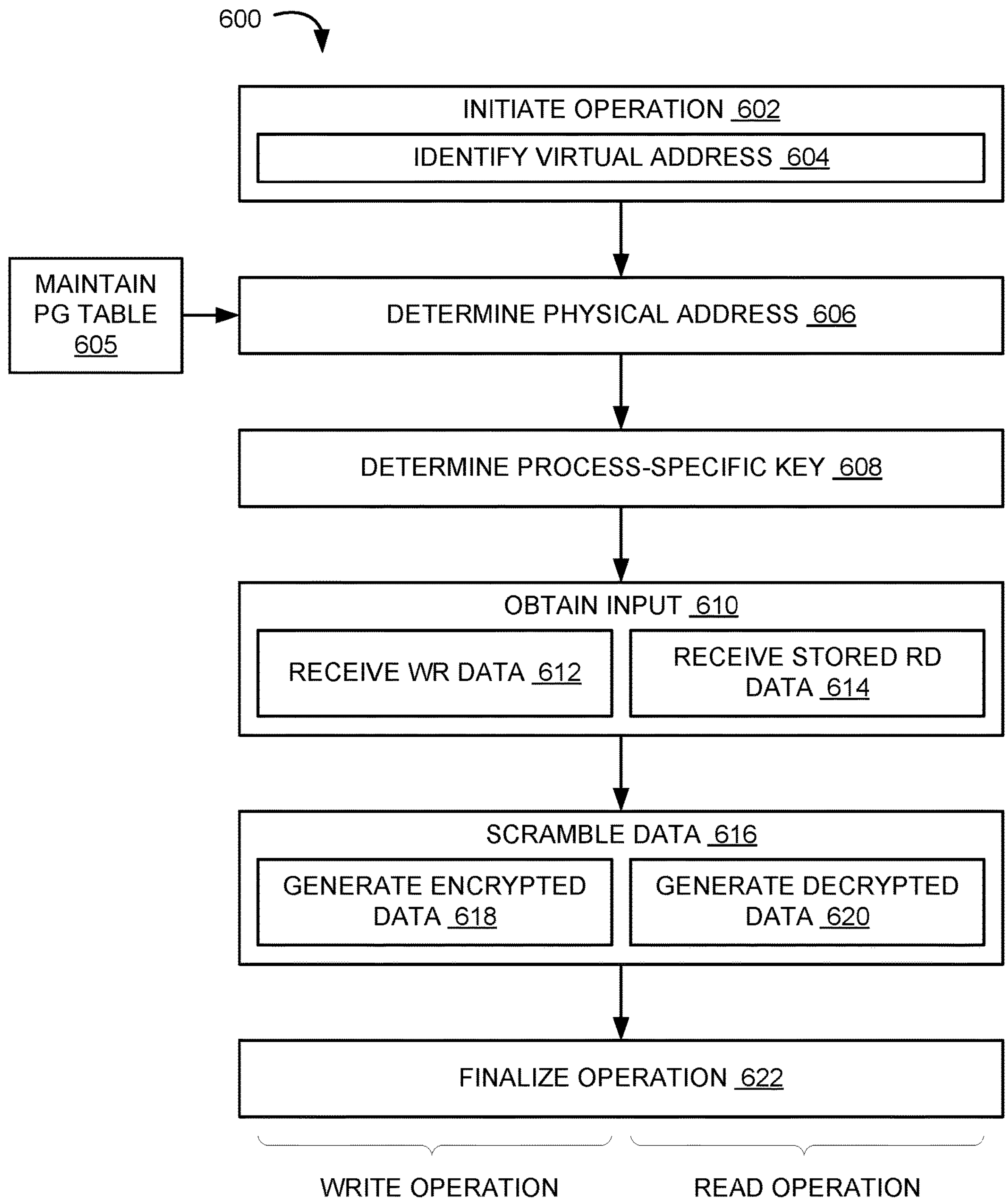
FIG. 6 is a flow diagram illustrating an example method of operating an apparatus in accordance with an embodiment of the present technology.

FIG. 6 is a flow diagram illustrating an example method 600 of operating an apparatus (e.g., the system 200 of FIG. 2, the processor 202 of FIG. 2, and/or the MMU 214 of FIG. 2) in accordance with an embodiment of the present technology. The method 600 can include encrypting and/or decrypting memory data according to a scrambling key (e.g., the scrambling key 324 of FIG. 3) unique to a computing process implementing the write and/or the read operations.

At block 602, the system 200 (e.g., the processor 202 of FIG. 2 and/or the processing core 302 of FIG. 3 therein) can initiate an operation, such as a memory operation (e.g., a write operation or a read operation). The processing core 302 can implement a computing process, such as a first process 502 of FIG. 5 and/or a second process 552 of FIG. 5. In implementing the computing process, the processing core 302 can initiate the operation to write or read memory data from or to the memory 204 of FIG. 2.

At block 604, the system 200 (e.g., the processor 202 and/or the processing core 302 therein) can identify a virtual memory address for the memory operation. To implement operation, the processing core 302 can identify a virtual memory address utilized by the computing process (e.g., an application and/or an operating system) for the memory operation.

At block 605, the system 200 (e.g., the translator 312 of FIG. 3) can maintain a page table (e.g., the first page table set 504 and/or the second page table set 554) for one or more computing processes. The translator 312 can maintain the page table based on tracking mappings between the virtual memory addresses and the corresponding physical memory addresses for the memory data. In some embodiments, the translator 312 and/or the processing core 302 can generate the page table and the scrambling key 324 as part of initiating a computing process. In one or more embodiments, the translator 312 and/or the processing core 302 can generate the scrambling key 324 according to a predetermined pattern or function or at random (e.g., via a random number generator). In one or more embodiments, the operating system or other privileged software can generate the page table and/or the scrambling key 324. The translator 312 and/or the processing core 302 can store the scrambling key 324 for each of the computing processes in the corresponding page table.

At block 606, the system 200 (e.g., the translator 312) can determine a physical address that corresponds to the virtual memory address. As described above, the translator 312 can use the page table to translate between the virtual memory addresses and the physical memory addresses associated with read/write operations and write operations for each of the computing process.

At block 608, the system 200 (e.g., the translator 312) can determine a process-specific key (e.g., the scrambling key 324). The translator 312 can access the page table for the computing process that initiated the memory operation to determine the scrambling key 324 unique to the initiating computing process. Accordingly, the translator 312 can provide scrambling key 324 to the scrambler circuit 320.

At block 610, the system 200 (e.g., the scrambler circuit 320 of FIG. 3) can obtain input for the encryption/decryption. The scrambler circuit 320 can receive scrambling key 324 from the translator 312. The scrambler circuit 320 can receive different input memory data for write operations and read operations. For write operations, as illustrated at block 612, the scrambler circuit 320 can receive the write data (e.g., the unscrambled memory data 322 of FIG. 3) from the processing core 302. For read operations, as illustrated at block 614, the scrambler circuit 320 can receive the stored read data (e.g., the scrambled memory data 326 of FIG. 3) from the memory 204. In other words, the scrambler circuit 320 can receive the data that was stored in the memory 204 according to the translated physical memory address.

At block 616, the system 200 (e.g., the scrambler circuit 320) can scramble the input data according to the scrambling key 324. As described above, the scrambler circuit 320 can be configured in hardware to implement a logical function, a bit-wise function, an arithmetic function, or a combination thereof. For example, the scrambler circuit 320 can include an XOR gate for each bit of the input data. The scrambler circuit 320 can generate output memory data based on encrypting or decrypting the input memory data according to scrambling key 324 via the encryption/decryption function.

For write operations, as illustrated at block 618, the scrambler circuit 320 can generate encrypted data (e.g., the scrambled memory data 326). The scrambler circuit 320 can encrypt the data from the processing core 302 (e.g., the unscrambled memory data 322) to generate the scrambled memory data 326. For read operations, as illustrated at block 620, the scrambler circuit 320 can generate decrypted data (e.g., the unscrambled memory data 322). The scrambler circuit 320 can decrypt the data read from the memory 204 to generate the unscrambled memory data 322.

At block 622, the system 200 can finalize the operation using the output of the scrambler circuit 320. For write operations, the system 200 can finalize the operation by storing the encrypted data. The processor 202 can send the scrambled memory data 326 to the memory 204, and the memory 204 can store the scrambled memory data 326 (i.e., instead of the original unscrambled content data) for the write operations. For read operations, the scrambler circuit 320 can provide the decrypted output to the processing core 302 for use by the initiating computing process.

When one computing process initiates the read operation and the write operation for the same virtual memory address, the scrambling key 324 used to encrypt and decrypt the information can be identical. Accordingly, the scrambler circuit 320 can decrypt the scrambled memory data 326 to recover the original content data that corresponds to the write operation. However, when different computing processes initiate the read and write operations for the same virtual memory address, the scrambling key 324 used to encrypt and decrypt information can be different. Accordingly, the scrambler circuit 320 can generate decryption output that is different than the original content data that corresponds to the write operation initiated by the different computing process.

Figure 7:
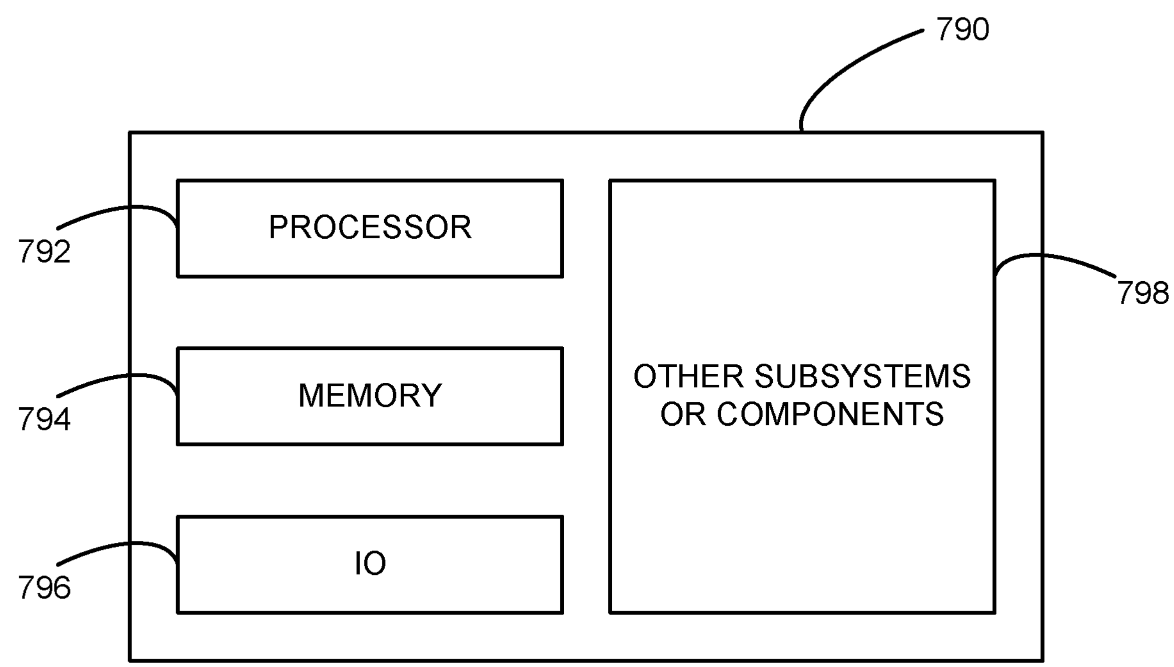
FIG. 7 is a schematic view of a system that includes an apparatus in accordance with an embodiment of the present technology.

FIG. 7 is a schematic view of a system that includes an apparatus in accordance with embodiments of the present technology. Any one of the foregoing apparatuses (e.g., memory devices) described above with reference to FIGS. 2-6 can be incorporated into any of a myriad of larger and/or more complex systems, a representative example of which is system 790 shown schematically in FIG. 7. The system 790 can include a processor 792, a memory device 794, an input/output device 796, and/or other subsystems or components 798.

The processor 792 and/or the memory device 794 can include features generally similar to those of the apparatus described above with reference to FIGS. 2-6, and can therefore include various features for securing the stored data. The resulting system 790 can perform any of a wide variety of functions, such as memory storage, data processing, and/or other suitable functions. Accordingly, representative systems 790 can include, without limitation, hand-held devices (e.g., mobile phones, tablets, digital readers, and digital audio players), computers, vehicles, appliances, and other products. Components of the system 790 may be housed in a single unit or distributed over multiple, interconnected units (e.g., through a communications network). The components of the system 790 can also include remote devices and any of a wide variety of computer readable media.

From the foregoing, it will be appreciated that specific embodiments of the technology have been described herein for purposes of illustration, but that various modifications may be made without deviating from the disclosure. In addition, certain aspects of the new technology described in the context of particular embodiments may also be combined or eliminated in other embodiments. Moreover, although advantages associated with certain embodiments of the new technology have been described in the context of those embodiments, other embodiments may also exhibit such advantages and not all embodiments need necessarily exhibit such advantages to fall within the scope of the technology. Accordingly, the disclosure and associated technology can encompass other embodiments not expressly shown or described herein.

In the illustrated embodiments above, the apparatuses have been described in the context of processors. Apparatuses configured in accordance with other embodiments of the present technology, however, can include other types of suitable digital processing circuits, such as field programmable gate arrays (FPGAs), microprocessors, central processing units (CPUs), graphics processing units (GPUs), etc.

The term "processing" as used herein includes manipulating signals and data, such as writing or programming, reading, erasing, refreshing, adjusting or changing values, calculating results, executing instructions, assembling, transferring, and/or manipulating data structures. The term data structure includes information arranged as bits, words or code words, blocks, files, input data, system-generated data, such as calculated or generated data, and program data. Further, the term "dynamic" as used herein describes processes, functions, actions, or implementation occurring during operation, usage, or deployment of a corresponding device, system or embodiment, and after or while running manufacturer's or third-party firmware. The dynamically occurring processes, functions, actions, or implementations can occur after or subsequent to design, manufacture, and initial testing, setup or configuration.

The above embodiments are described in sufficient detail to enable those skilled in the art to make and use the embodiments. A person skilled in the relevant art, however, will understand that the technology may have additional embodiments and that the technology may be practiced without several of the details of the embodiments described above with reference to FIGS. 2-7.

I claim:

1. An apparatus, comprising:

a core configured to process data;

a logic coupled to the core and configured to provide security at a hardware layer, wherein the security is transparent to an application developer that is developing an application outside of operating systems and privileged software, and wherein the logic is configured as a translator to track a scrambling key associated with the data; and a circuitry coupled to the core and configured to further provide the security by:

encrypting the data according to the scrambling key at the hardware layer prior to the data being written to memory, and recovering the data based on decrypting at the hardware layer, using the scrambling key, data read from the memory.

2. The apparatus of claim 1, wherein the logic is configured to maintain a page table for the computing process, wherein:

the page table is configured to translate between a virtual memory address and a physical memory address associated with storage of the data, wherein the page table includes a range of virtual memory addresses accessible for the computing process; and the page table includes the scrambling key uniquely assigned to each page table entry describing a physical page.

3. The apparatus of claim 1, wherein:

the core is configured to implement a first computing process for the data;

the scrambling key is unique to the first computing process; and the circuitry is configured to uniquely encrypt the data or decrypt the stored data for the first computing process according to the scrambling key.

4. The apparatus of claim 3, wherein:

processing the data includes a write operation for storing the data at a memory; and the circuitry is configured to:

receive the data, and generate scrambled memory data based on encrypting the data according to the scrambling key, wherein the scrambled memory data is stored at the memory.

5. The apparatus of claim 4, wherein:

the core is configured to implement an unauthorized computing process that includes an unauthorized read operation from a same virtual memory address as the write operation of the first computing process;

the logic is configured to provide the circuitry a second scrambling key unique to the second process; and the circuitry is configured to:

receive the scrambled memory data, and generate output data based on decrypting the scrambled memory data according to the second scrambling key, wherein the output data is different from the data associated with the write operation.

6. The apparatus of claim 4, wherein:

the core is configured to continue implementing the first computing process that includes a read operation from a same virtual memory address as the write operation; and the logic is configured to provide the scrambling key to the circuitry for the read operation; and the circuitry is configured to:

receive the scrambled memory data, and recover the original data based on decrypting the scrambled memory data according to the scrambling key.

7. The apparatus of claim 1, wherein the circuitry is configured in hardware to implement a logical function, a bit-wise function, an arithmetic function, or a combination thereof, using as inputs the scrambling key and either the data for encryption or the stored data for decryption.

8. The apparatus of claim 7, wherein the circuitry is configured in hardware to generate output data based on implementing an exclusive OR (XOR) function on the inputs.

9. The apparatus of claim 8, wherein:

each of the inputs include an n number of bits; and the circuitry includes an n number of XOR gates, wherein each of the XOR circuits is configured to:

receive a bit of the data for encryption or the stored data for decryption, receive a bit of the scrambling key, and generate a bit of the output data based on implementing the XOR function on the bit of the scrambling key and the bit of the data for encryption or the bit of the stored data for decryption.

10. The apparatus of claim 1, wherein the apparatus comprises a processor.

11. A method comprising:

receiving input data to be written to one or more memory addresses at circuitry configured to provide security operations at the hardware layer by encrypting the data with a scrambling key and decrypting the data with the scrambling key, wherein the scrambling key is tracked at a hardware layer, and wherein the security operations implemented at the hardware layer is transparent to an application developer that is developing an application outside of operating systems and privileged software;

receiving the scrambling key at the circuitry, wherein the scrambling key comprises a unique identifier associated with a computing process; and transmitting encrypted data to be written to a memory array or decrypted data read from the memory array according to the scrambling key.

12. The method of claim 11, wherein:

the input memory data is associated with a read operation or a write operation initiated by the computing process; and further comprising:

determining the scrambling key unique to the computing process for encrypting or decrypting the input memory data.

13. The method of claim 12, wherein:

the input memory data is an unscrambled memory data for the write operation;

further comprising:

sending the output scrambled memory data to a memory for storage.

14. The method of claim 12, further comprising:

receiving scrambled memory data from a memory for the read operation initiated by the computing process that initiated the corresponding write operation to store the scrambled memory data at the memory;

wherein:

the input memory data is the scrambled memory data; and generating the output memory data includes recovering original content data associated with the write operation.

15. The method of claim 12, further comprising:

receiving scrambled memory data from a memory for the read operation initiated by the computing process that is different from a second process that initiated the corresponding write operation to store the scrambled memory data at the memory;

wherein:

the scrambling key is different from a second key used to scramble the scrambled memory data;

the input memory data is the scrambled memory data; and the output memory data is different than original content data associated with the write operation.

16. The method of claim 12, further comprising maintaining a page table for the computing process, wherein:

the page table is configured to translate between a virtual memory address and a physical memory address associated with read operations and write operations for the computing process; and the page table includes the scrambling key unique to the computing process.

17. The method of claim 16, wherein:

the page table includes a range of virtual memory addresses associated with the computing process; and the page table includes the scrambling key associated with each page table entry describing a physical page.

18. The method of claim 11, wherein generating the output memory data includes providing the input data and the scrambling key as inputs into a hardware circuit configured to implement a logical function, a bit-wise function, an arithmetic function, or a combination thereof.

19. The method of claim 18, wherein generating the output memory data includes implementing an exclusive OR (XOR) function on the input data and the scrambling key.

20. A system, comprising:

a memory configured to store data; and a processor communicatively coupled to the memory, the processor including:

a core configured to process content data for a computing process, a logic coupled to the core and configured to provide security operations implemented at a hardware layer, wherein the logic is configured as a translator to determine a scrambling key associated with the computing process, wherein the security operations are transparent to an application developer that is developing an application outside of operating systems and privileged software, and a circuitry coupled to the core and configured to further provide the security operations by:

encrypting the content data according to the scrambling key to generate the data written to the memory, and decrypting, using the scrambling key, the stored data read from the memory.

21. The system of claim 20, wherein the logic and the circuitry comprise a memory management unit (MMU).

22. The system of claim 20, wherein:

the core is configured to implement a write operation to store the content data;

the circuitry is configured to:

receive the content data from the core as an input, receive the scrambling key from the logic, and generate scrambled memory data based on encrypting the input according to the scrambling key; and the memory is configured to store the scrambled memory data for the write operation.

23. The system of claim 20, wherein:

the core is configured to implement a read operation for the computing process;

the memory is configured to provide scrambled memory data for the read operation; and the circuitry is configured to:

receive the scrambled memory data from the memory as an input, receive the scrambling key from the logic, and generate output data based on decrypting the input according to the scrambling key.

24. The system of claim 20, wherein the logic is configured to maintain a page table for the computing process, wherein:

the page table is configured to translate between a virtual memory address and a physical memory address at the memory, wherein the page table includes a range of virtual memory addresses accessible for the computing process; and the page table includes the scrambling key uniquely assigned to each page table entry describing a physical page of the memory.

* * * * *